J. H. SWAN.
INDICATOR FOR THERMOSTATS.
APPLICATION FILED DEC. 6, 1915.
1,269,758.
Patented June 18, 1918.
3 SHEETS—SHEET 2.
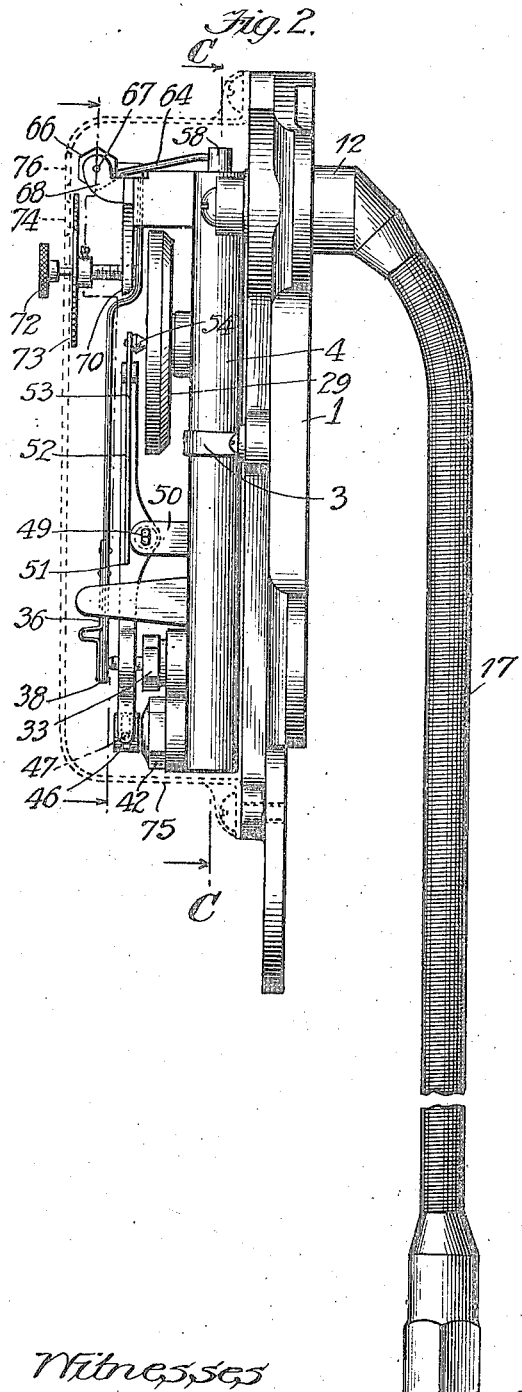
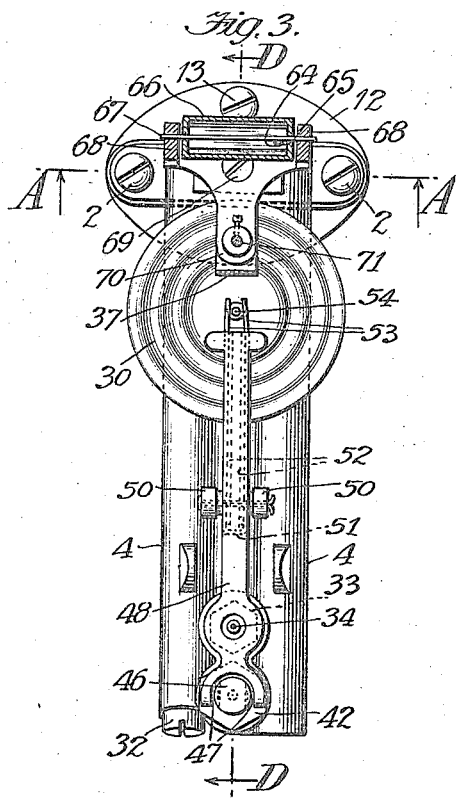
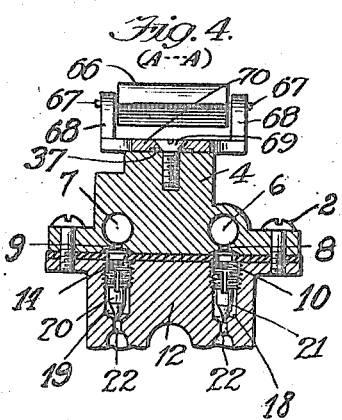

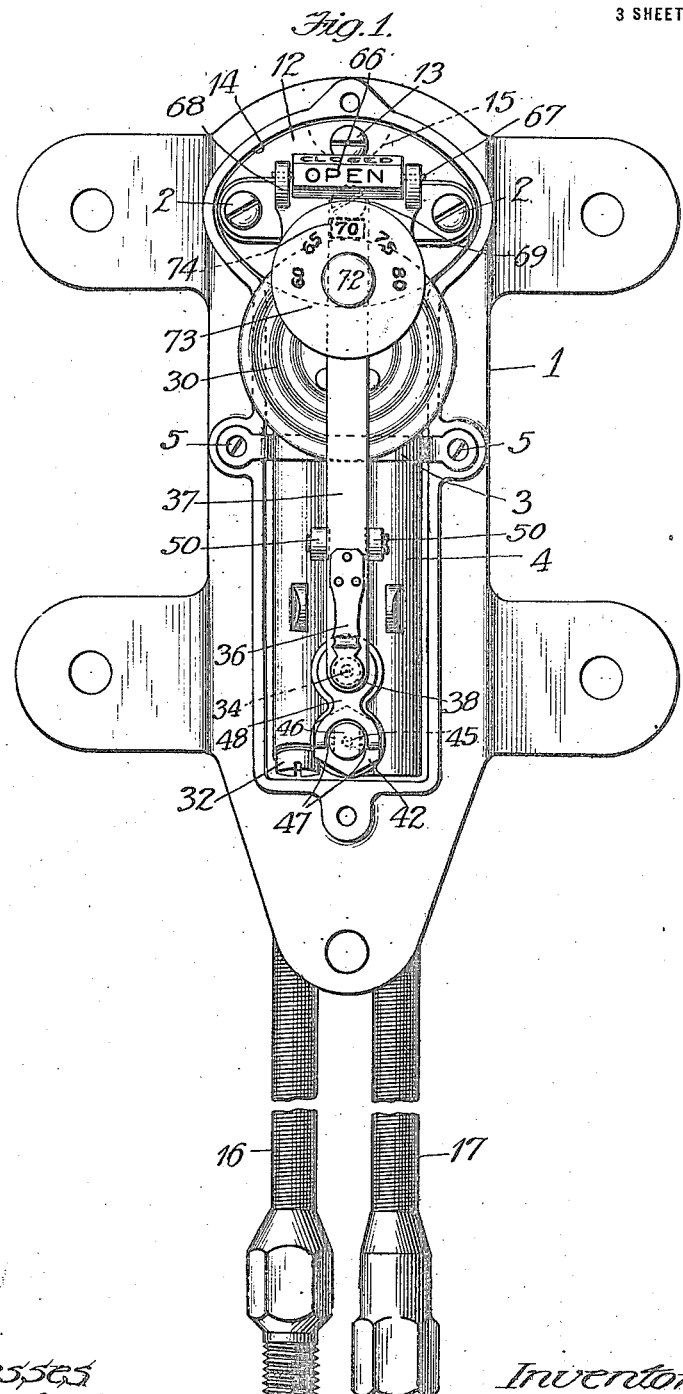

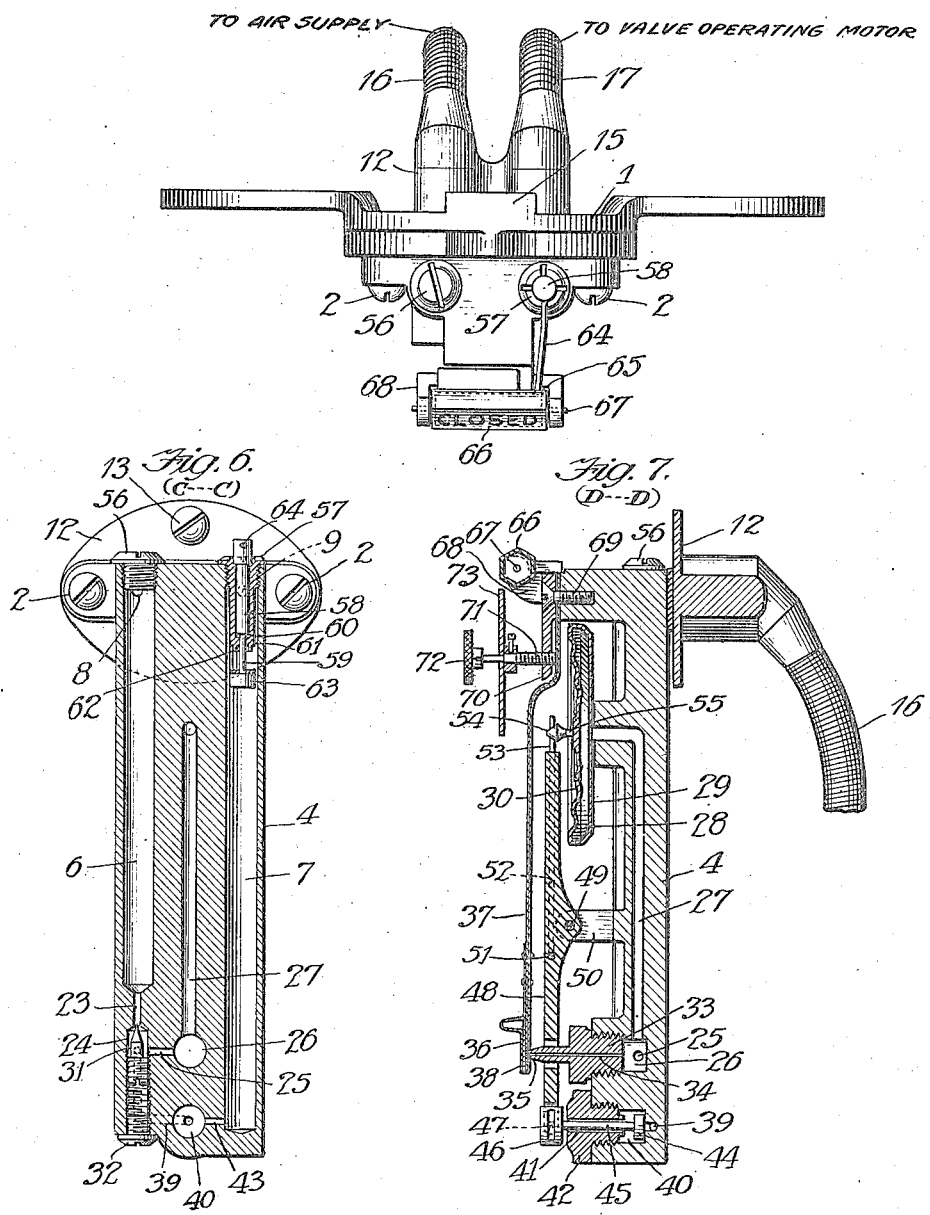

UNITED STATES PATENT OFFICE.

JOHN H. SWAN, OF CHICAGO, ILLINOIS, ASSIGNOR TO KLIPFEL MANUFACTURING CO., OF CHICAGO, ILLINOIS, A CORPORATION OF ILLINOIS.

INDICATOR FOR THERMOSTATS.

1,269,758.   Specification of Letters Patent.   Patented June 18, 1918.

Application filed December 6, 1915. Serial No. 65,379.

*To all whom it may concern:*

Be it known that I, JOHN H. SWAN, a citizen of the United States of America, and a resident of Chicago, county of Cook, State of Illinois, have invented certain new and useful Improvements in Indicators for Thermostats, of which the following is a specification.

This invention relates to improvements in combined thermostats and indicator constructions for temperature regulating systems.

The objects of the invention are to provide an improved instrument of this class in one unitary structure, including thermostatically controlled means for controlling the operation of distant valves in heating systems, etc., and an indicating device for indicating the condition of the said distant valves; and to provide an indicator of this nature having operating connections which may be mechanically independent of the thermostat mechanism but operated by variations in pressure therein.

An illustrative embodiment of this invention is shown in the accompanying drawings, in which:

Figure 1 shows the improved device in front elevation with the casing removed.
Fig. 2 is a side elevation with the casing shown by dotted lines.

Fig. 3 shows the device in front elevation with the wall plate and thermostatic lamina omitted and the indicator in a section.
Fig. 4 is a sectional view taken on the line A—A of Fig. 3.

Fig. 5 is a plan view.

Fig. 6 is a sectional view taken on the line C—C of Fig. 2.
Fig. 7 is a sectional view taken on the line D—D of Fig. 3.

The device shown in the drawings is of that general class of thermostats employed for controlling the operation of pressure-actuated valves or dampers in heating systems, although such devices are adapted for performing other than this particular class of work, for example, the controlling of humidifying apparatus, in which case a hydrometric element is substituted for the thermostatic lamina here shown.

In the example shown in the drawings, the device is furnished with conduits, one of which leads to an air compressor and the other of which leads to valve operating motors. The valve mechanism on the thermostat controls the flow of air into and out of said last mentioned conduit and in this manner controls the operation of the valve operating motor in the heating system. The valve in the thermostat for regulating the flow of air from one conduit to another is directly controlled by a small pressure operated diaphragm, the actuation of which is in turn controlled according to temperature changes by a thermostatic lamina which opens and closes a port leading to a chamber at the rear of said diaphragm. A valve operating mechanism of this nature is shown and described in applicant's Patent No. 1,157,059, dated October 19, 1915.

The purpose of the present invention is mainly to provide improved indicating mechanism for devices of the same general class described in the above mentioned pat-tent. The indicator serves to disclose without a close examination of the device, whether the valves of the heating system are open or closed.

In some arrangements now in use, indicators are operated directly by the valve operating levers of thermostats but are unsatisfactory, since they depend for operation on this lever, and indicate according to its position, even if the valves of the thermostat are not operating correctly. The present indicator moves to one position or another according to the pressure existing in the conduits leading to the valve operating motors of the heating system.

Referring to the drawings, the device includes a wall plate 1 which is usually depressed in the plaster of the wall on which the device is supported. The frame 4 of the device rests in an aperture 14 in wall plate 1 and is supported on pipe head 12 by screws 2. The pipe head is in turn secured to wall plate 1 by screw 13 threaded into boss 15. A strap 3 encircles frame member 4 without necessarily engaging the same, but in position to prevent lateral displacement thereof. This strap is secured to wall plate 1 by the screws 5.

The frame 4 is provided with a pair of channels 6 and 7 communicating with ports 8 and 9 leading rearwardly from the upper part of frame 4 and registering with ports 10 and 11 in the pipe head 12. The head 12 supports conduits 16 and 17 respectively leading to an air supply tank or air compressor and valve operating motors in the heating system.

The conduits 16 and 17 respectively, communicate through the channels 18 and 19 in head 12 with the ports 8 and 9 in frame 4. The passage of air into and out of conduits 16 and 17 is regulated, or completely prevented when the frame 4 is removed from wall plate 1, by small conical restriction plugs 20 and 21 threaded into the passages 18 and 19 and adapted to seat in the restricted parts 22 of said passages. These plugs are slotted, as shown, to provide a passage for air from the channels 6 and 7 to the passages 18 and 19. By this arrangement, air may pass into channels 6 from conduit 16 through the port 8 and out of passage 7 into the conduit 17 through the port 9. The passage 6 at its lower end communicates through the drilled holes 23, 24, 25 and 26 with the passage 27 leading upwardly into a chamber 28 formed by a thin plate 29 and a flexible diaphragm 30 secured at its periphery to said plate.

The flow of air from the passage 6 to the hole 26 may be limited by a small conical plug 31 tapped into the hole 24, the outer end of which is closed by screw 32. Tapped into the hole 26 (Fig. 7) is a plug 33 having a small axial passage 34 therein and terminating in a seat 35 for a resilient valve 36 carried by a responsive element or thermostatic lamina 37 and faced with a disk or plate 38 of suitable material for preventing the escape of any air through passage 34 when the resilient member 36 rests on the valve seat 35. A by-path 39, shown by dotted lines in Fig. 6, may conduct air from the hole or passage 24 to a hole 40 drilled into the lower end of frame or casting 4. The hole 40 communicates with the outer atmosphere through an axial passage 41 in a plug 42 threaded into said hole and also through a restricted passage 43, shown in Fig. 6, communicates with the passage 7.

A valve 44 carried by a stem 45 is shiftable within the hole 40 for closing communication between the latter and either the outer atmosphere through passage 41, or the channel 7 through the passage 43. At its outer end the valve stem 41 carries a grooved collar 46 engaged by pins 47 carried by a forked lever 48 pivotally mounted by a pin 49 between lugs 50 extending outwardly from frame 4. Lever 48 is provided with a small transverse hole 51 and longitudinal grooves 52 at its sides for receiving a U-shaped spring wire 53. The free outer ends of this wire engage a small cam 54 secured by a stem 55 to diaphragm 30 at the central point thereof. The cam 54 is largest at its central portion, being tapered between its ends and thereby serving to rock lever 48 in either direction through engagement with the free ends of spring 53.

The passages 6 and 7 which may be cored into the casting of frame 4 are closed at their upper ends respectively, by screws 56 and 57. The screw 57 is hollow, providing a way in which an indicator plunger operator 58 is slidable. The size of the plunger 58 is preferably reduced at its lower end 59 to provide a shoulder 60 for resting on shoulder 61 of screw 57, thus preventing the plunger from dropping into the passage 7 when the device is assembled. At its lower end the screw 57 is provided with a seat 62 for a stopper 63 carried at the lower end of plunger 58. Air may normally pass between the channel 7 and conduit 17 in either direction through the port 9, the lower end of screw 57 being reduced in diameter so as not to interfere with the flow of air. Upon any increase in pressure in channel 7, the plunger 58 is forced upwardly, stopper 63 engaging the seat 62 and thereby preventing any possible leakage of air around plunger 58. At its upper end the plunger 58 carries a wire 64 fitted in a hole in the head of said plunger and having its free end extending loosely into a hole 65 in a hollow indicator drum 66. The indicator drum is pivotally mounted by pins 67 on a bracket 68 supported on frame 4 by screw 69. The indicator is oscillated in its bearings according to motions of plunger 58 upon an increase or decrease of pressure in channel 7. It is preferably hexagonal, as shown, two of its faces being provided with the words "closed" and "open," as appears in Fig. 1.

The bracket 68 is provided at its lower end with a boss 70 through which is threaded an adjusting screw 71 for the lamina 37. By means of this screw the lamina which is supported at its upper end between the bracket 68 and frame 4 may be tensioned more or less, or moved toward or away from the valve seat 35. Then when the lamina is distorted by changes of temperature, it will move away from or engage the seat 35 at the temperature to which it is responsive according to its angular seating, as determined by screw 71. The screw 71 carries fast a knurled head 72 by which it may be operated, and also a disk 73 bearing numbers which may register with a sight opening 74 in the casing 75. A sight opening 76 is also provided in casing 75 opposite the indicator 66.

In the operation of the device, a certain predetermined pressure is normally maintained in conduit 16 by the air compressor. There is a normal flow of air from this conduit through the port 8 into the channel 6 from whence it passes through the holes 23, 24, 25 and 26 to the passage 34 leading to the outer atmosphere. The valve 36, carried by the lamina 37, is normally disengaged from the seat 35 when the temperature of the surrounding atmosphere is below some predetermined maximum. Under these circumstances it is impossible for sufficient pressure to build up in the chamber 29 and force the diaphragm 30 outwardly, since the air may escape through passage 34. Lever 48 is also normally in the position shown in Fig. 7, permitting atmospheric pressure in conduit 17, since this conduit at such times communicates with the outer atmosphere through the port 9, channel 7 and passages 43, 40 and 41.

With the normal atmospheric pressure in channel 7, the plunger 58 is in the position shown in Fig. 6, to which it falls by gravity, the indicator being maintained in position to indicate the word "open," thus designating that the heating fluid is passing through the radiators. When the temperature of the surrounding atmosphere rises to the point sufficient to cause lamina 37 to seat valve 36, air cannot escape through passage 34 and therefore flows from channel 6 through the holes 23, 24, 25 and 26 into the passage 27 leading to the chamber 28. The pressure therefore builds up behind diaphragm 30, forcing the same outwardly, thus causing cam 54 to engage the ends of the U-shaped wire 53 spreading the arms of the wire apart until they pass the ridge of the cam. The inward pressure of the ends of spring 53 then cause the same to ride down the inner inclined surface of cam 54, rocking the lower end of lever 48 outwardly causing the valve 44 to become unseated from aperture 39 and to close the communication between hole 40 and passage 41. Air under pressure may then pass from channel 6 through passages 23 and 24 and by-path 39 and passages 40 and 43 into the passage 7 and out of port 9 into conduits 17. The pressure is thus permitted to increase in passage 7 and in conduit 17, resulting in forcing the indicator operator plunger 58 upwardly, and operating the valve controlling motors of the heating system to shut off the steam from the radiators. The upward movement of plunger 58 causes indicator 66 to indicate the word "closed" at the sight opening 76 in casing 75.

When the temperature again falls sufficiently to cause lamina 37 to move away from the outlet port afforded by passage 34, air is permitted to escape from the chamber 28 through the passages 27, 26 and 34. The return of diaphragm 29 to its normal position causes lever 48 to be restored to the normal position, as shown in Fig. 7, thus closing port 39 and permitting air to escape from passage 7 through the passages 43, 40 and 41. By this means the pressure in conduit 17 falls to normal, permitting the diaphragms of the valve operating motors to return to normal position and thus again allow the steam to flow into the radiators. Also this decrease in pressure in channel 7 permits the plunger 58 to fall to normal position and rock the indicator to indicate the word "open."

From the foregoing it may be seen that the invention provides an improved unitary structure for both controlling the operation of distance valve, dampers, etc., and indicating the condition of such distant devices.

Although but one specific embodiment of this invention has been herein shown and described, it will be understood that numerous details of the construction shown may be altered or omitted without departing from the spirit of this invention as defined by the following claim.

I claim:—

A thermostatic valve mechanism, comprising a frame provided with an inlet channel having communication with a supply of fluid under pressure, an outlet channel having communication with a valve or damper operating motor, a valve for regulating the flow of fluid from said inlet channel to said outlet channel, a thermostatic element controlling said valve, an indicator for indicating the condition of said valve or damper operating motor, and pressure operated means in communication with said outlet channel for operating said indicator, said indicator comprising a drum journaled on said frame and connected to said pressure operated means.

Signed at Chicago this 24th day of Nov., 1915.

JOHN H. SWAN.